United States Patent [19]

Anderson

[11] 4,264,984

[45] Apr. 28, 1981

[54] HIGH-SPEED MULTIPLEXING OF KEYBOARD DATA INPUTS

[76] Inventor: Alan M. Lovelace, Administrator of the National Aeronautics and Space Administration, with respect to an invention of Tage O. Anderson, Arcadia, Calif.

[21] Appl. No.: 974,473

[22] Filed: Dec. 29, 1978

[51] Int. Cl.³ .......................... G06F 3/02; H04J 3/14; H04Q 11/04
[52] U.S. Cl. ................................. 364/900; 364/200; 370/58
[58] Field of Search ... 364/200 MS File, 900 MS File; 179/15 A, 15 AL, 18 B, 99; 340/183, 711, 365 R, 365 S, 502, 505, 518; 370/58, 53, 86, 90, 62

[56] References Cited

U.S. PATENT DOCUMENTS

| | | | |
|---|---|---|---|
| 3,162,857 | 12/1964 | Sanders | 340/183 |
| 3,500,336 | 3/1970 | Cuccio | 340/711 |
| 3,588,838 | 6/1971 | Felcheck | 364/900 |
| 4,047,158 | 9/1977 | Jennings | 364/900 |
| 4,100,601 | 7/1978 | Kaufman et al. | 364/200 |

*Primary Examiner*—James J. Groody

*Attorney, Agent, or Firm*—Monte F. Mott; John R. Manning; Paul F. McCaul

[57] ABSTRACT

A high-speed multiplexing system of keyboard data inputs in which keyboard entered data is sequentially and automatically sampled by the multiplexing system for input to a computer. More specifically, a system is disclosed whereby a plurality of data inputs from a plurality of keyboards are applied to a multiplexer having a single output connected to a computer. A sequencer is provided which sequentially and automatically controls the multiplexer to sample each keyboard input in accordance with a predetermined sampling sequence. Whenever keyboard entered data appears on input lines to the multiplexer, the system inputs the keyboard data to the computer during a brief time interval in which tne multiplexer remains at the particular keyboard address or port. Thus, a high-speed sampling circuit is provided whereby the only operator action required is data entry through a keyboard. Priority or interrupt systems are not required, and the multiplexer merely samples each keyboard output continually at high speed according to a predetermined sequence.

8 Claims, 5 Drawing Figures

HIGH-SPEED MULTIPLEXING OF KEYBOARD DATA INPUTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The invention relates generally to systems for interfacing a plurality of data entry means to a computing means, and more specifically to multiplexing systems in which data inputs are sampled and transferred to a computing system.

BACKGROUND OF THE INVENTION

Conventional high-speed multiplexing systems for providing keyboard entered data to a computer operate on the basis of a keyboard operator generating an input message through a succession of depressions of one or more keys, and then upon completion of the message entry, pressing a transmit, execute, or end-of-message button. Upon receipt of this instruction providing signal, an interfacing unit then provides a signal to the computer indicating that a message is ready and the keyboard from which the message originated. Then in accordance with a predetermined priority system either in the interfacing unit or in the computer, the message is transferred to the computer at an appropriate time. Therefore, as one can appreciate, a conventional system requires that the operator press more than just data-entry keys to input message data to the computer, thus requiring more keyboard hardware, computer software and memory.

As the number of keyboards increases, the greater effect these priority systems and associated waiting periods have on a rapid and economical transfer of data. A system according to the present invention eliminates the need for a priority sampling system and the need for accessing keyboards only when data is entered therethrough. This is effected by a keyboard sampling or multiplexing system in which each keyboard is automatically, continually and sequencially sampled without any requirement for an operator to request access to a computer.

SUMMARY OF THE INVENTION

The invention provides a system for interfacing data entered at a plurality of data entry locations to a processing means. A multiplexer is provided which has inputs corresponding to each of the data entry locations and a single output corresponding to one of the inputs. A means is provided to automatically step the multiplexer so as to sequentially and automatically connect each of the multiplexer inputs to the multiplexer output. In addition, the multiplexer inputs are continually sampled so that if any data entered at one of the data entry locations appears thereon, data will be transferred into a processing means which could be a computer. Upon transfer of the data, the processing means provides a "resume sequence" signal which causes removal of data from the multiplexer input, thereby allowing new data to be entered from the same keyboard and multiplexer sampling to continue. Should the computer refuse to accept data from the multiplexer output, a time-out circuit is provided whereby sampling will be automatically continued after a predetermined length of time. Thus, the invention provides a means whereby data from a large number of data entry locations which could be keyboards can be automatically transferred to a computer without requiring any operator actions other than a manual entry of only data information.

In a specific application, a plurality of keyboards comprise the data entry locations and are utilized in conjunction with a multichannel high resolution graphic display system controlled by a video processor. Each keyboard is associated with a video monitor and the keyboard operator can select a video display and display format which corresponds to data entered by keys on the keyboard. The video monitor provides an immediate visual indication to the keyboard operator as to whether keyboard entered instructions were properly processed by the graphic display system. However other systems having a plurality of data entry locations could also utilize the interfacing means of the present invention. Multiple entries at a keyboard could be processed in accordance with appropriate software so that a plurality of keyboard entries would comprise a single data input.

DETAILED DESCRIPTION

As required, a detailed illustrative embodiment of the invention is disclosed herein. This embodiment exemplifies the invention and is currently considered to be the best embodiment for such purposes. However, it is to be recognized that other means for providing data from an input keyboard to a multiplexer, and other means for sequentially and automatically stepping a multiplexer could be utilized. Accordingly, the specific embodiment disclosed is representative in providing a basis for the claims which define the scope of the present invention.

As previously described, the invention provides a means for sequentially and automatically connecting a plurality of keyboards to a computing or processing means, the connecting being accomplished by a multiplexer. The multiplexer is stepped by an automatic sequencing means which also provides a digital identifier corresponding to the connected keyboard. When the multiplexer input corresponding to the connected keyboard contains entered data, a request signal is generated which is utilized by the processing means to indicate that the multiplexer output contains keyboard entered data. Normally the keyboard data will be entered to the processing means during the interval between steps of the automatic sequencing means, however the invention also provides a means whereby the multiplexer will not begin stepping again until the processing means has received the data present at the multiplexer output. Yet another provision is included so that a malfunctioning keyboard or processing means will not be able to indefinitely disable the multiplexing system. This provision incorporates a time-out circuit which reinitiates sequencing a predetermined time after data sampling by the processing means is initiated, the predetermined time being on the order of milliseconds. In addition, the sequencing means also provides the digital identifier to the processing means which corresponds to the connected keyboard. Thus, a keyboard sampling system is provided whereby each keyboard is continually, automatically, and sequentially sampled without the necessity of request to transmit, execute or end-of-message keys sometimes required by conventional systems.

Figure 1:
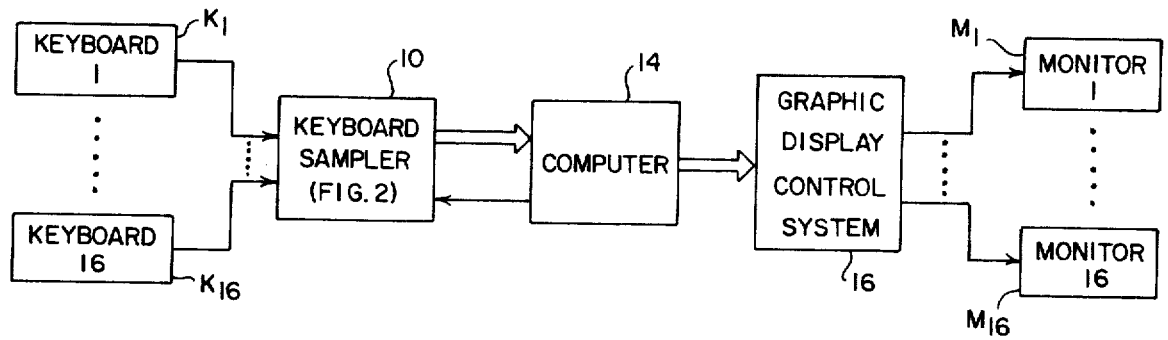
FIG. 1 is a block diagram of a system employing a keyboard sampler for interfacing a plurality of keyboards to a computer.

Referring now to FIG. 1, a keyboard sampler 10 comprises an interfacing means between sixteen keyboards $K_1-K_{16}$ to a computer or processing means 14. Although sixteen keyboards have been chosen for exemplary purposes, a much larger number of keyboards could be accomodated. In this embodiment, each keyboard $K_1-K_{16}$ is associated with a corresponding video monitor $M_1-M_{16}$, and each keyboard entry designates a specific video display and video display format. The displays and display formats are supplied to the monitors $M_1-M_{16}$ by a graphic display control system 16 controlled by the computer 14. The keyboard sampler 10 provides a rapid and efficient means of interfacing display requirements of the various keyboard operators to the computer 14 which in turn controls the monitors associated with the various keyboards. As will become apparent, the keyboard sampler 10 provides a means whereby all a keyboard operator needs to do is to depress a key corresponding to a desired display format, although the keyboard or computer could be configured so that more than one key depression would be required for a desired display format. Auxillary controls such as a transmit or execute key, or delays due to waiting in accordance with a predetermined priority computer interrupt system are not required because the keyboard sampler continually, automatically, and sequentially samples each keyboard at high speed in accordance with a predetermined order.

Figure 2:
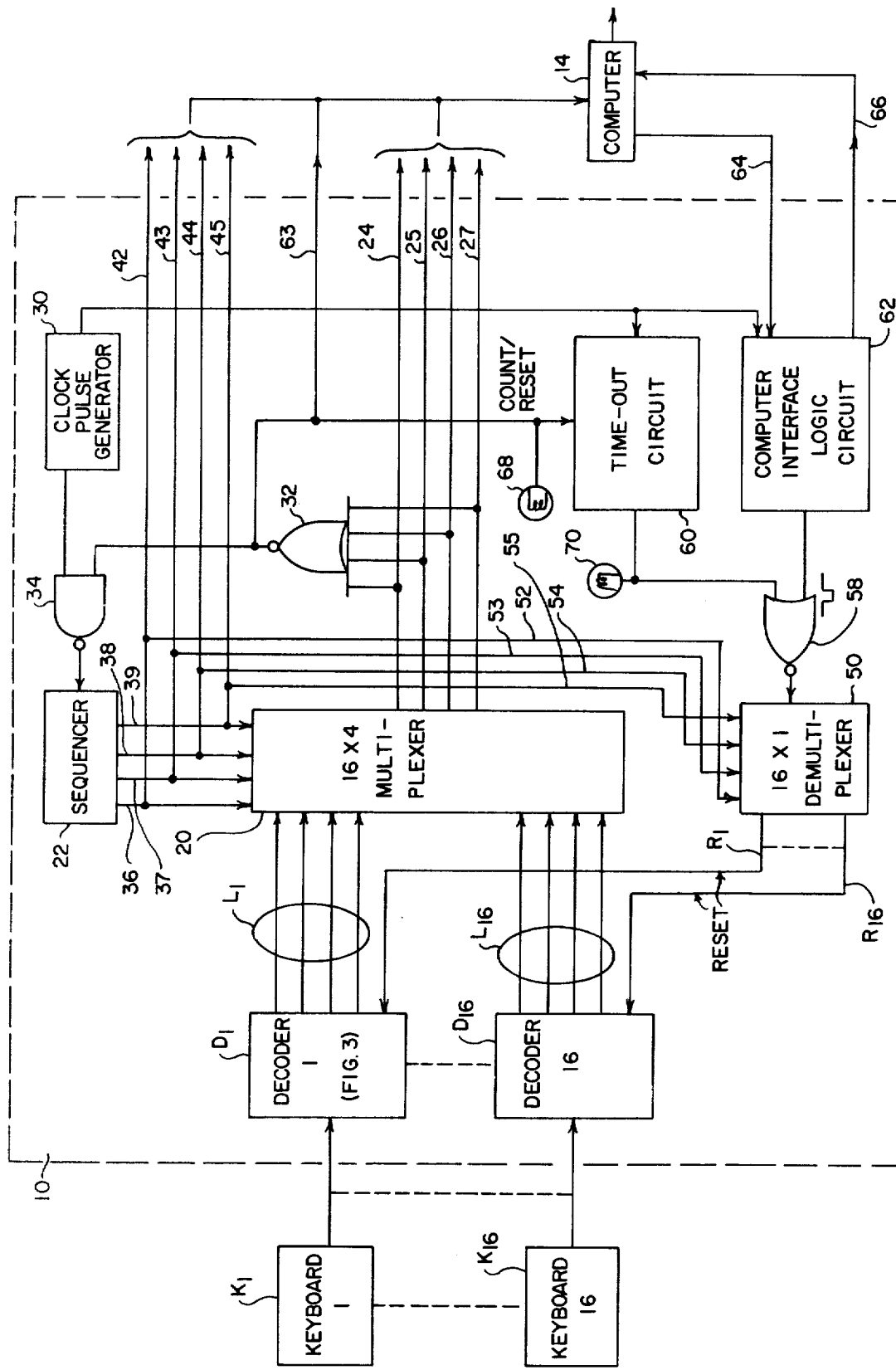
FIG. 2 is a block and logic diagram of the keyboard sampler shown in FIG. 1.

Referring now to FIG. 2, the keyboard sampler 10 is shown having inputs from each of the keyboards $K_1-K_{16}$ and outputs to the computer 14. Keyboards $K_1-K_{16}$ have been chosen to be of the type in which one or more audio tones are generated in response to a particular key being depressed. The invention is not in any way limited to the use of a touchtone keyboard however. In the exemplary embodiment, a four-bit byte has been chosen for format definition, thereby allowing 15 format selection keys to be utilized from each of the keyboards $K_1-K_{16}$. The reason for 15 rather than 16 format selections is because one four-bit digital pattern must be reserved to correspond to no data entry at the keyboard and will be explained in detail below. A decoder corresponding to each keyboard $D_1-D_{16}$ is provided within the keyboard sampler 10, the decoder converting the tone corresponding to each of the 15 format selection keys on the keyboard to a four-bit digital signal which is provided on four output lines, each of which comprises a set $L_1-L_{16}$ corresponding to each of the decoders $D_1-D_{16}$. A decoder output of all zeros corresponds to no signal appearing on the keyboard output line.

A 16×4 multiplexer 20 (the 16 referring to the number of input channels and the 4 referring to the number of lines per channel), which is controlled by a sequencer 22 to be explained in detail below, sequentially connects each of the sets of decoder output line sets $L_1-L_{16}$ to four computer interface lines 24-27. A clock pulse generator 30 and a data sensing NOR gate 32 are provided to control the sequencer 22. If the computer interface lines 24-27 are all low, i.e., correspond to zero, the NOR gate provides an output which is high, the output being supplied to a sequencer-controlling NAND gate 34. The clock pulse generator 30 also supplies output pulses to the NAND gate 34. When a clock pulse and a high output from the NOR gate 32 are present at the NAND gate 34 input, a pulse is provided to the sequencer 22 causing it to change a digital identifier appearing on four multiplexer control lines 36-39. Each change in a digital identifier causes the multiplexer 20 to step to the next decoder output line set. If a data signal corresponding to a 1, i.e., a high signal, appears on any of the computer interface lines 24-27, the output of the NOR gate 32 will be low, thereby preventing any pulses from reaching the sequencer 22 through the NAND gate 34. The digital identifiers appearing on the multiplexer control lines 36-39 are chosen to correspond to the particular keyboard being sampled by the multiplexer 20. As can been seen, the digital identifier provided by the sequencer 22 is also supplied to the computer via four sequencer/computer interface lines 42-45.

A 16×1 demultiplexer 50 (the 16 referring to the number of output channels and the 1 referring to the number of output lines per channel) also receives as an input the digital identifier from the sequencer 22 on four sequencer/demultiplexer interface lines 52-55 and generates a reset signal at the appropriate time as will be explained below. The demultiplexer 50 provides the reset signal on the appropriate reset line $R_1-R_{16}$ corresponding to the decoder whose output is currently connected to the computer interface lines 24-27 as indicated by the digital identifier from the sequencer 22. The decoders $D_1-D_{16}$ are configured so that a reset signal on its corresponding reset line $R_1-R_{16}$ will reset its output to all zeros, thereby causing the NOR gate 32 to become high and the sequencer 22 to output the next digital identifier. A demultiplexer controlling NOR gate 58 provides a reset pulse to the demultiplexer 50 whenever signal either appears from a time-out circuit 60 or a computer interface logic circuit 62. The computer interface logic circuit 62, sometimes referred as a handshake logic unit by those familiar with computer control circuits, is a standard circuit used by two computing systems having asynchronous clocks and is described in U.S. Pat. No. 3,988,716. In operation, an output from the data sensing NOR gate 32, designated as a request signal, is provided to the computer 14 on a request line 63. When the request signal changes to a low state, which indicates that keyboard entered data is present on the computer interface lines 24-27, the computer 14 sends a response signal on a response line 64 which in turn causes the computer interface logic circuit 62 to generate a ready signal on a ready line 66 in accordance with the teachings of the above-referenced patent. Upon receipt of the ready signal, the computer 14 accepts data contained on the computer interface lines 24-27 and the keyboard identifier present on the sequencer/computer interface lines 42-45. The computer 14 removes the response signal on response line 64 after accepting the data and digital identifier, thereby causing the computer interface logic circuit 62 to provide a pulse to the demultiplexer controlling NOR gate 58 which, as previously explained, causes the demultiplexer 50 to generate a reset signal. In addition, the time-out circuit 60 is chosen so that it will also provide a pulse to the demultiplexer-controlling NOR gate 58 if a predetermined time lapses after the request signal on the request line 63 goes low. The time-out circuit 60 is controlled by pulses from the clock pulse generator 30. The time-out circuit 60 begins counting when the request signal first appears on the request line 63. If the predetermined time chosen for the time-out circuit 60 occurs before the request signal is removed, a pulse is supplied to the demultiplexer-controlling NOR gate 58, thereby removing data from the computer interface lines 24–27. This data removal allows the sequencer 22 to output the next digital identifier, as previously explained, which in turn causes the multiplexer 20 to step the next decoder output line set. The purpose of the time-out circuit 60 is to ensure that multiplexer stepping will continue if for some reason the computer 14 fails to accept data contained on the sequencer and computer interface lines 24–27 and 42–45. Two indicator lights 68 and 70 have been provided to visually advise an operator if the time-out circuit is being utilized, its utilization indicating that the computer 14 is not accepting data in a timely manner.

Figure 3:
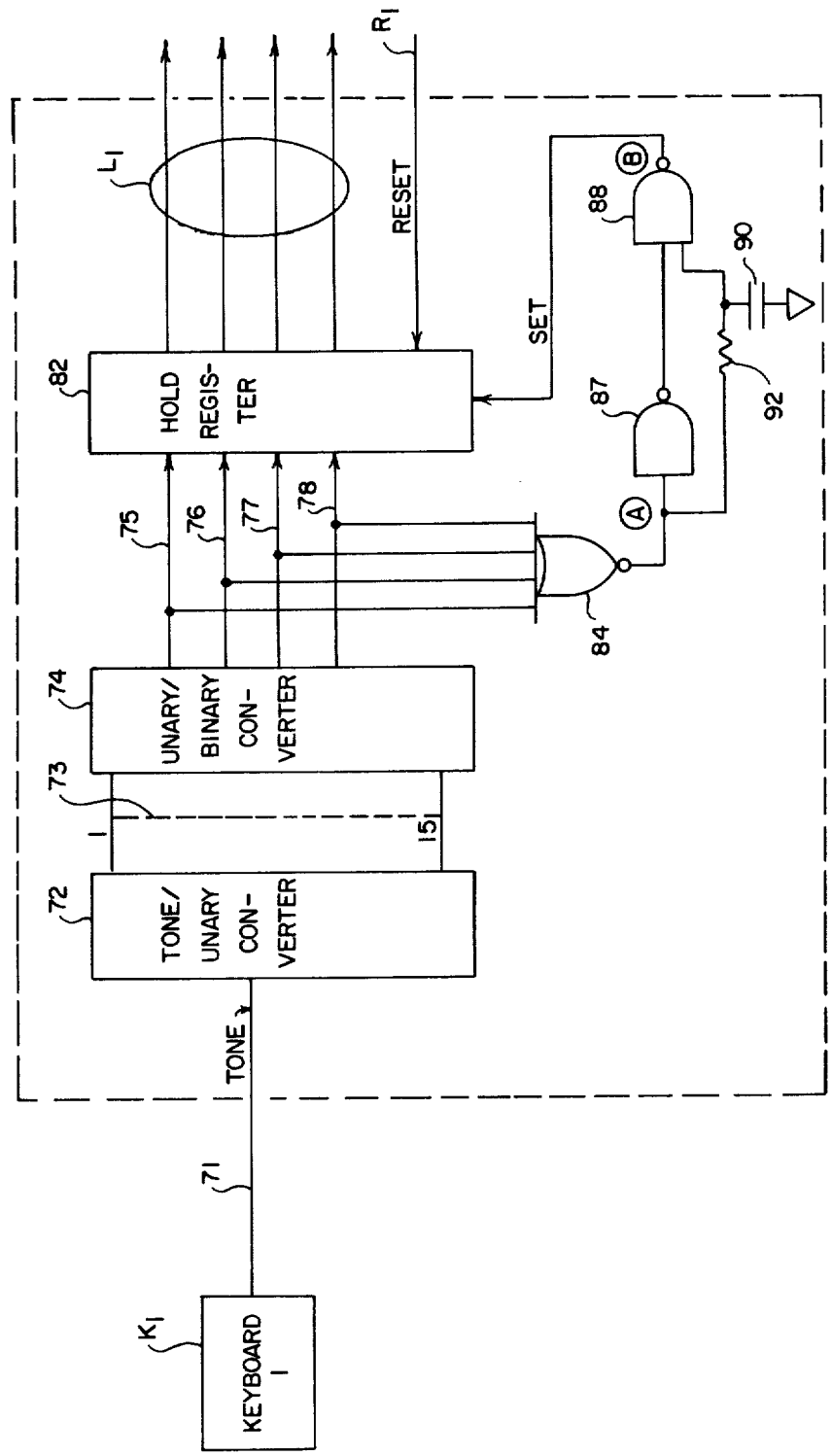
FIG. 3 is a block and logic diagram of one of the decoders contained in the keyboard sampler of FIG. 2.

As previously explained, each keyboard $K_1$–$K_{16}$ has an associated decoder $D_1$–$D_{16}$. In the exemplary embodiment being described, the keyboards are of the type which generate an audio frequency which is a discordant combination of two other frequencies, each generated audio frequency being indicative of a specific key on the keyboard. These keyboards are well known in the art, one type of which utilizes a 466 integrated circuit chip for coding and a 467 integrated circuit chip for decoding, both chips being manufactured by National Semiconductor Corporation. Referring now to FIG. 3, the first keyboard $K_1$ has a tone containing output line 71 which is connected to a tone-to-unary converter 72 which provides an output on any one of 15 possible lines as shown at 73. Each of the output lines shown at 73 correspond to a key being depressed on the keyboard $K_1$. As previously explained, only 15 output lines are provided, since one of the four-bit digital combinations must be reserved to indicate that there is no keyboard-entered data present on the computer interface lines 24–27 shown in FIG. 2. An output signal on any of the 15 output lines of the tone-to-unary converter 72 is converted to a corresponding four-bit binary signal in a unary-to-binary converter 74. Four unary-to-binary converter output lines 75–78 are provided. As has been previously explained, an output on these lines 75–78 corresponding to all zeros indicates that they do not contain any keyboard-entered data. The digital data contained on the unary-to-binary converter output lines 75–78 are held in a standard hold register 82, the output of which comprises the decoder output line set $L_1$ going to the multiplexer 20.

Figure 4:
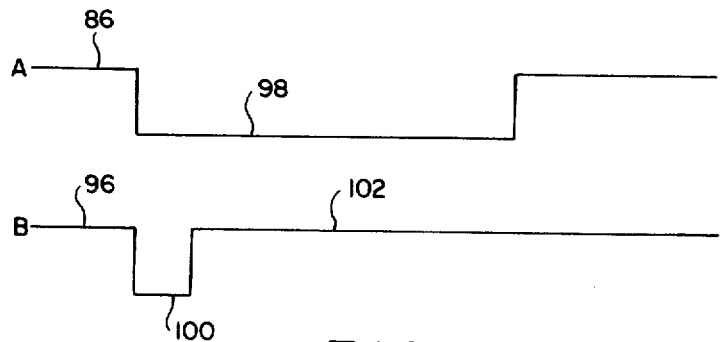
FIG. 4 is waveform diagram taken at certain points in the decoder of FIG. 3.

It is important that the appropriate four-bit digital signal is transferred to the hold register 82 when an operator depresses a key on the keyboard $K_1$. However, if the computer 14 properly accepts the data on the computer interface lines 24–27 and a reset signal is provided to the hold register 82 on its corresponding reset line $R_1$, it is important that that data not be reintroduced into the hold register 82 merely because an operator did not lift his finger quickly enough from the depressed key. Thus, it is necessary that the hold register 82 is updated only once for a given keyboard depression, irrespective of how long the key remains depressed. In order to effect this function, the four output lines 75–78 from the unary-to-binary converter 74 are also connected to a NOR gate 84. When these lines 75–78 all have signals corresponding to zeros, the output of the NOR gate 84 is high as can be seen by referring to waveform A of FIG. 4 as represented at 86. This high output is inverted by a first NAND gate 87 whose output comprises an input to a second NAND gate 88. In addition, a high output from the NOR gate 84 charges a capacitor 90 through a resistor 92, thereby providing a high input to the second NAND gate 88. Thus, the second NAND gate 88 output is also a high signal as shown in waveform B of FIG. 4 at 96. However, when a high signal appears on any of the unary-to-binary converter lines 75–78, the output of the NOR gate 84 goes low as is shown at 98 of waveform A. This low output 98 causes the output of the first NAND gate 87 to go high; however, the output of the second NAND gate 88 will remain low as shown at 100 until the charge on the capacitor 90 discharges through the resistor 92. At this time, the output of the second NAND gate 88 will go high as shown at 102. It is the pulse as represented at 100 which then causes the hold register 82 to be set and to accept the binary output signals from the unary-to-binary converter 74. However, the hold register 82 is constructed so that it can only accept data during a time when waveform B is in a low condition, thereby insuring that the hold register 82 can only be updated once for a single keyboard depression. As can be seen by again referring to FIG. 4, even though waveform A shows that the keyboard was depressed for a significant period of time as shown at 98, only one set period as shown in waveform B at 100 occurred. Thus even though a reset signal $R_1$ cleared the contents of the hold register 82, the hold register 82 will not be updated until the unary-to-binary converter output lines 75–78 return to zero, thereby allowing the capacitor 90 to again assume a charge corresponding to a high output from the NOR gate 84.

Figure 5:
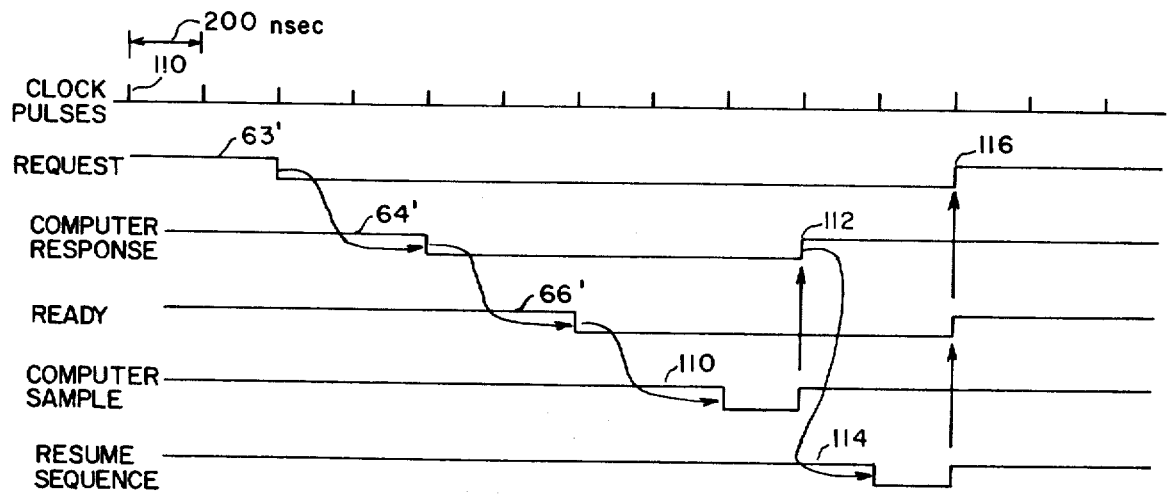
FIG. 5 is a waveform diagram showing the relationship between the various control signals of the keyboard sampler of FIG. 2.

Operation of the keyboard sampler 10 can best be understood by referring to FIG. 2 in conjunction with FIG. 5 which shows the various timing waveforms of the system. The clock pulse generator 30 provides clock pulses at a frequency of 5 MHz as shown at 110. These clock pulses are supplied to the computer interface logic circuit 62. The request signal 63' on the request line 63 is generated as previously explained when data appears on the computer interface lines 24–27. When the computer 14 receives the request signal 63' it sends a computer response signal 64' to the computer interface logic circuit 62. Two clock pulses later the computer interface logic circuit 62 sends a ready signal 66' to the computer 14 which initiates the read-in process from the various interface lines 24–27 and 42–45. The computer read-in time is shown on the computer sample waveform 110 and is usually completed within the period of a single clock pulse. Upon completion of the read-in process the computer 14 releases the response line 64' as shown at 112. At this time, the computer 14 provides a resume sequence signal 114 which, though the computer interface logic circuit 62, is applied to the demultiplexer-controlling NOR gate 58, thereby causing the request signal 63' to go high as shown at 116.

This then causes the sequencer 22 to output the next digital identifier and multiplexer 20 stepping is resumed.

It should now be appreciated that a keyboard sampling or interface system has been provided which allows continuous and automatic sequencing of a multiplexer to sample data from the output of a plurality of keyboards, without requiring any ready, transmit or interrupt entries to be made by the keyboard operator.

What is claimed is:

1. In a system for interfacing data from a plurality of data entry locations to a processing means, an improved data sampling means comprising:

a multiplexer having input means and output means;

first means for continuously providing data from each of said plurality of data entry locations to said multiplexer input means;

automatic sequencing means for sequentially connecting said multiplexer input means corresponding to each of said plurality of data entry locations to said multiplexer output means, said automatic sequencing means comprising:

a sequencer having a plurality of output identifiers each of which corresponds to one of said plurality of data entry locations; means for causing said sequencer to output each of said identifiers according to a predetermined sequence;

means for providing said sequencer output identifiers to said multiplexer whereby said multiplexer output means will contain data from a data entry location corresponding to said sequencer output identifier;

checking means for determining if data entered from one of said plurality of data entry locations is present at said multiplexer output means, said checking means comprising means for developing a request signal whenever data entered at one of said plurality of data entry locations is contained at said multiplexer output means;

means responsive to said checking means for preventing said sequencer from changing output identifiers until said multiplexer output means does not contain data entered from one of said plurality of data entry locations;

means for providing said request signal and said sequencer output identifier to said processing means;

removal means for removing data from said multiplexer output means, said removal means being controlled by said processing means;

a time-out circuit for generating a termination signal a predetermined time after said request signal is developed;

means for controlling said removal means by said termination signal; and second means for providing data at said multiplexer output means to said processing means.

2. The improved data sampling means of claim 1 in which said first means comprises a plurality of decoders each of which corresponds to one of said plurality of data entry locations, each decoder comprising:

a hold register having a data input means and a data output means connected to said multiplexer input means;

means for providing data from a corresponding data entry location to said hold register input means whereby data related to said data from a corresponding data entry location appears at said hold register output means; and said automatic sequencing means removal means comprises means for generating a removal signal for removing data from said hold register output means.

3. The improved data sampling means of claim 2 in which said data from said plurality of data entry locations comprises a predetermined number of tones, each of said decoders further comprising:

means for converting said data tones to a plurality of binary signals;

means for providing said binary signals to said hold register input means; and means for preventing said hold register input means from affecting said hold register output means more than once for each data entry from said data entry location.

4. A system for interfacing entered data from a plurality of data entry keyboards each having an output means to a processing means, comprising:

means for automatically sampling in a predetermined order said entered data appearing at said keyboard output means, said means for automatically sampling comprising a multiplexer having an output corresponding to said keyboard-entered data currently being sampled;

means for identifying each of said keyboards being sampled with an associated keyboard identifier, said means for identifying comprising a sequencer having a plurality of keyboard identifier outputs for controlling stepping of said multiplexer whereby said multiplexer samples said keyboard output means corresponding to said keyboard identifier provided by said sequencer;

means for determining if said multiplexer output current being sampled contains keyboard-entered data;

means for providing said keyboard-entered data at said multiplexer output and its associated keyboard identifier to said processing means, said processing means comprising a means for providing a "resume sequence" signal to indicate that said keyboard-entered data being sampled has been received by said processing means;

means for removing said keyboard-entered data currently being sampled from said multiplexer output when said "resume sequence" signal is provided by said processing means; and means for delaying further automatic stepping of said multiplexer until said keyboard-entered data currently being sampled is removed from said multiplexer output.

5. The system of claim 4 wherein said means for removing comprises:

means for generating a "time-out" signal when a predetermined time has elapsed after current sampling has been initiated; and means responsive to said "resume sequence" signal and said "time-out" signal for removing said keyboard entered data currently being sampled from said multiplexer output.

6. The system of claim 5 further comprising a plurality of decoders one of which corresponds to each of said plurality of keyboards, each decoder comprising:

converting means for converting said keyboard entered data into a plurality of digital signals;

a hold register having said digital signals as an input and a plurality of output lines, each corresponding to a location of one of said digital signals with respect to the other digital signals; and means connecting said plurality of decoder output lines to said multiplexer, said decoder output lines containing data corresponding to said keyboard entered data.

7. The system of claim 6 in which each of said decoders further comprises means for connecting said hold register to said means for removing whereby said hold register is reset so that said hold register output lines will contain digital signals corresponding to no data entered at that corresponding keyboard when said "resume sequence" signal appears or said predetermined time has elapsed.

8. The system of claim 7 in which each of said decoders further comprises means for preventing said digital signals on said hold register output lines from being changed more than once for each keyboard data entry.

* * * * *